W. W. BOLLS.
DENTAL INSTRUMENT.
APPLICATION FILED OCT. 17, 1914.
1,168,052.
Patented Jan. 11, 1916.
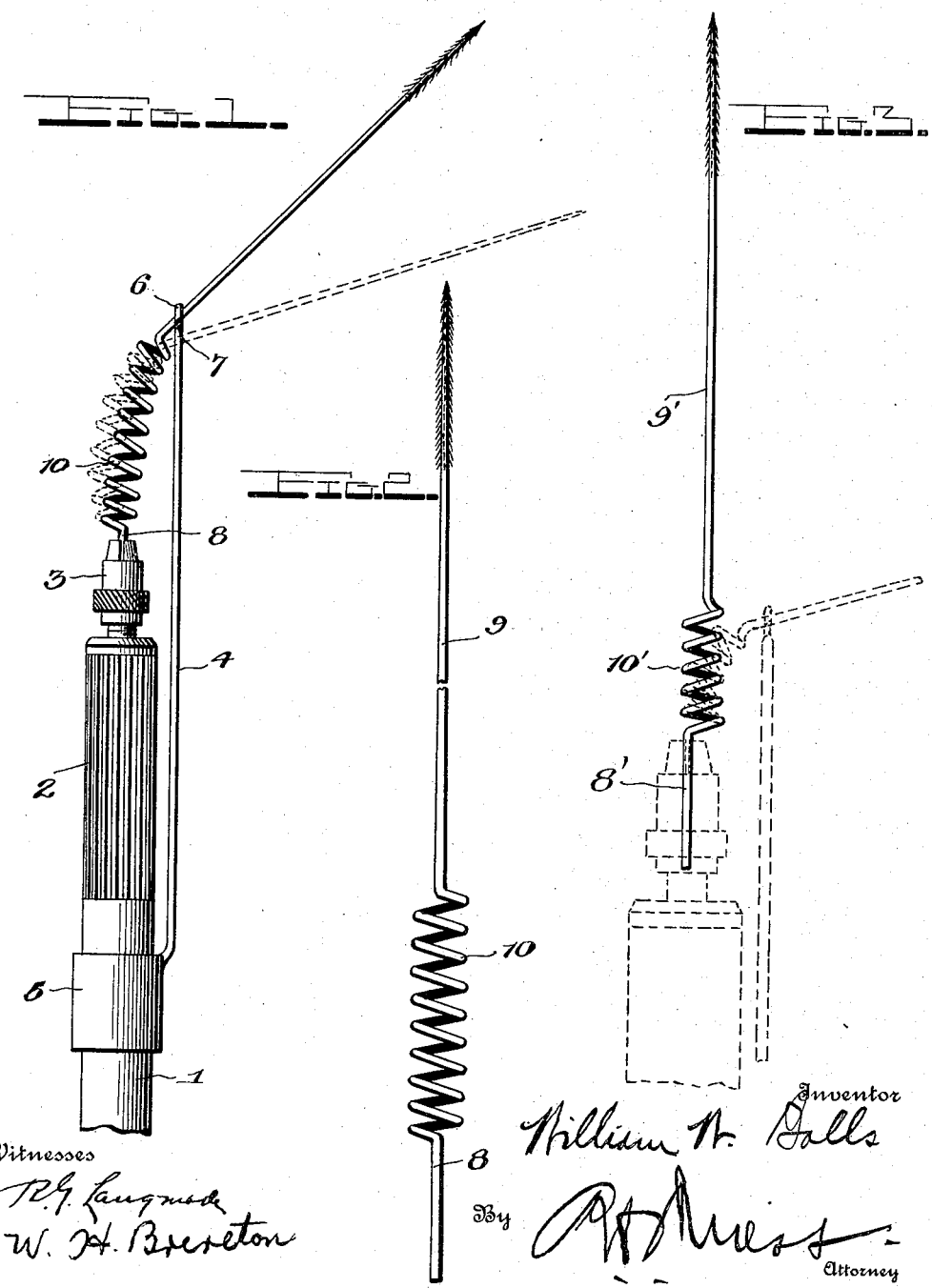

UNITED STATES PATENT OFFICE.

WILLIAM W. BOLLS, OF WASHINGTON, DISTRICT OF COLUMBIA.

DENTAL INSTRUMENT.

1,168,052.  Specification of Letters Patent.  Patented Jan. 11, 1916.

Application filed October 17, 1914. Serial No. 867,114.

*To all whom it may concern:*

Be it known that I, WILLIAM W. BOLLS, a citizen of the United States, residing at Washington, in the District of Columbia, have invented new and useful Improvements in Dental Instruments, of which the following is a specification.

This invention relates to certain new and useful improvements in dental instruments, and pertains more particularly to broaches designed for use with the broach holder disclosed in my Patent No. 1,063,109, granted May 27, 1913.

The primary object of the invention is to provide a broach which can be instantly and easily adjusted so as to have its working or free end portion assume various angular positions relative to the longitudinal axis of the holder, without distorting or bending the broach, such as will cause same to have irregular or wabbly rotative movement.

A further object of the invention is to provide a broach which is constructed so that upon rotation thereof, the work engaging end of the broach will be given reciprocatory movement, to thereby move inwardly and outwardly in the cavity, thus more quickly cleansing the cavity and loosening the matter therein.

More specifically, the invention consists in providing a broach with a series of coils or convolutions which are pitched in a direction transverse to the longitudinal axis of the broach and which are located between the end of the broach that is held in the chuck of the rotating head and the eye of the adjustable arm that provides a relatively stationary point about which the broach is rotated, the coils forming a flexible connection between the ends of the broach, enabling the latter to easily and quickly respond to any adjustments of the arm in disposing the working end of the broach at varying angles to the longitudinal axis of the holder, such as may be necessitated in treating back teeth or the like.

In the drawings: Figure 1 is a fragmentary side elevation of an instrument equipped with the present invention; Fig. 2 is a side elevation of the broach; *per se* and Fig. 3 is a fragmentary side elevation of a modified form of the invention.

The holder 1, has a knurled head 2 rotatably connected thereto, the head carrying a chuck 3 of any desired form. The arm 4 is connected to a spring collar 5, which latter embraces the holder 1 so as to be readily adjustable along the length of the holder, all of which aforementioned parts are disclosed in my patent above identified. The arm 4 has an eye 6 into which the free end of the broach is introduced through a slot 7, the latter preferably having the walls formed by the slot diagonally disposed with relation to the longitudinal axis of the arm, so as to reduce to a minimum, any possible accidental disengagement of the broach from the eye.

The broach is made of a single or integral piece of material having a short end 8, a long or working end 9, and a series of transverse coils 10 which connect said ends so as to allow the long or working end 9 to be easily and quickly moved at any desired angle to the end 8, which latter is rigidly secured in the chuck 3.

The coils 10 when the broach is operatively connected to the holder are disposed between the chuck 3 and the eye 6 of the arm 4, permitting the arm 4 to be adjusted to any desired position so as to cause the working end of the broach to assume various required angular relations to the longitudinal axis of the holder, which adjustments are effected by mere sliding of the collar 5 along the length of the holder until the desired angular relation of the working end of the broach to the holder is had.

With the present invention the coils 10 allow the free end of the broach to readily and quickly respond to the adjusting movements of the arm 4 without distorting or bending the broach, such as would cause uneven, or irregular movement of the same, when rotated in the eye 6. Since the coils are incorporated in the broach as an integral part thereof, the action of the working end of the broach is directly transferred to the hand of the dentist to allow the latter to determine the effectiveness of the broach in its work.

It is particularly to be noted that the inner end of the broach, that is held in the chuck, is not moved nor subjected to an appreciable strain during any of the adjustments of the working end of the broach, due to the flexible connection between said ends that the coils provide. The flexible connection, is also of advantage, in that less pressure is exerted by the working end of the broach or the eye, due to its presence, enabling thereby, the working action of the broach to be more readily determined by the operator.

Referring to the modified form of the invention illustrated in Fig. 3 of the drawing, it will be seen that the coils and the working end 9′ are all offset or arranged in a plane to one side of the plane in which the chuck engaging end 8′ of the broach is located, the purpose of which is to cause the working end of the broach to have a longitudinal reciprocating movement, or end thrust in addition to its rotary movement so as to alternately move into and out of the tooth cavity to thus more quickly cleanse the latter by removing the matter from the cavity. The coils 10′ in the modified form of the invention form, so to speak, a crank or eccentric connection between the broach ends, thus causing the working end 9′ to be reciprocated longitudinally for the purpose aforementioned.

What is claimed is:

1. In combination with a holder having broach rotating means, and means adjustable on the holder to directly engage the free end of the broach to hold said free end at varying angles to the longitudinal axis of the broach, an integral broach having an inner end held by said rotating means and an outer end connected to the inner end by a series of transverse coils the coils being arranged between the point of engagement of the adjustable means with the outer end of the broach and the rotating means.

2. A rotatable broach comprising an end adapted to be secured to a driving member, and a working end connected to the first end eccentrically when in normal position and adapted to be angularly related to the first end of the broach.

3. A broach comprising an end adapted to be secured to a rotary chuck, a working end, a coiled connection between the broach ends being axially offset relative to the first end of the broach, and a movable member for adjusting the working end of the broach at an angle to the first broach end whereby on rotation of latter end the offset coiled connection will impart a reciprocation to the working broach end.

In testimony whereof I have hereunto set my hand in presence of two subscribing witnesses.

WILLIAM W. BOLLS.

Witnesses:
ROYCE A. RUESS,
W. H. BRERETON.

Copies of this patent may be obtained for five cents each, by addressing the "Commissioner of Patents, Washington, D. C."